United States Patent [19]

Morikawa et al.

[11] Patent Number: 5,691,413

[45] Date of Patent: Nov. 25, 1997

[54] ETHYLENE-α-OLEFIN-NON-CONJUGATED DIENE COPOLYMER RUBBER COMPOSITION

[75] Inventors: Akihiko Morikawa; Masayuki Motonari; Masashi Shimakage; Katsumi Oka, all of Yokkaichi, Japan

[73] Assignee: Japan Synthetic Rubber Co., Ltd., Tokyo, Japan

[21] Appl. No.: 532,098

[22] Filed: Sep. 22, 1995

[30] Foreign Application Priority Data

Sep. 29, 1994 [JP] Japan ..................... 6-259060

[51] Int. Cl.$^6$ .................. C08J 9/06; C08L 23/16
[52] U.S. Cl. .................. 525/99; 525/89; 525/211; 525/240; 521/140
[58] Field of Search ............... 525/99, 89, 240, 525/211; 521/140

[56] References Cited

U.S. PATENT DOCUMENTS

| | | | |
|---|---|---|---|
| 4,722,971 | 2/1988 | Datta et al. | 525/211 |
| 4,833,194 | 5/1989 | Kuan et al. | 525/211 |
| 4,866,100 | 9/1989 | Iwasa et al. | 521/140 |
| 5,093,381 | 3/1992 | Yamamoto et al. | 521/140 |

FOREIGN PATENT DOCUMENTS

| | | |
|---|---|---|
| 0 332404 | 9/1989 | European Pat. Off. . |
| 59-14497 | 4/1984 | Japan . |
| 4-80245 | 3/1992 | Japan . |
| 6-92498 | 11/1994 | Japan . |

OTHER PUBLICATIONS

International Rubber Conference, pp. 271–276, 1975, Kiyosha Honma, et al., "EPDM for Cellular Extrusions".

*Primary Examiner*—Andrew E. C. Merriam
*Attorney, Agent, or Firm*—Oblon, Spivak, McClelland, Maier & Neustadt, P.C.

[57] ABSTRACT

An ethylene-α-olefin-non-conjugated diene copolymer rubber composition which comprises two kinds of ethylene-α-olefin-non-conjugated diene copolymers, [the copolymers (A) and (B)], copolymer (A) containing ethylidenenorbornene and either dicyclopentadiene or α,ω-diene having 8 to 20 carbon atoms in the main chain as the non-conjugated dienes, copolymer (B) containing ethylidenenorbornene as the non-conjugated diene, the weight ratio of the copolymer (A) to the copolymer (B) being 30/70 to 70/30, wherein the copolymer (A) has a relatively low molecular weight, a specific ethylene/α-olefin weight ratio and a specific non-conjugated diene content and the copolymer (B) has a relatively high molecular weight and a specific ethylene/α-olefin weight ratio. Said copolymer rubber composition, when highly foamed, shows no reduction particularly in low tensile stress, and is excellent in shape-retention during cross-linking and foaming, and in compression set and processibility.

15 Claims, 1 Drawing Sheet

ETHYLENE-α-OLEFIN-NON-CONJUGATED DIENE COPOLYMER RUBBER COMPOSITION

BACKGROUND OF THE INVENTION

This invention relates to an ethylene-α-olefin-non-conjugated diene copolymer rubber composition which contains two specific ethylene-α-olefin-non-conjugated diene copolymers, can be highly foamed and has a good processibility, has a high stiffness even when highly foamed, is excellent in compression set, kneader-processibility (processibility in internal mixer) and extruder-processibility, and also excellent in shape-retention during vulcanization and foaming and is applicable to a wide use including a sealing material for automobile.

Ethylene-α-olefin-non-conjugated diene copolymer rubbers are excellent in characteristics such as heat resistance, ozone resistance, weather resistance and the like, and are widely used in sponge articles, particularly sealing members for automobile such as door seal, roof side rail, trunk seal and the like. Recently, however, as the performance of automobile has been heightened, such sponge articles have been required to have high level performance.

For example, invasion of outdoor noises such as engine noise and noises around door into the interior of an automobile room at high speed driving; leaking of rain; and the like depend greatly upon the sealing performance of a spongy rubber around the door (proportional to the stiffness of the sponge rubber), and such sponges are required to be excellent in sealing performance. Also, after the door has been shut, the sponge is used in the compression state for a long period of time, and hence, it is required that the compression set is small. Accordingly, the requirement for sealing performance and low permanent set in fatigue of the sponge has now become severer.

Moreover, since the cross-sectional shape of a sealing sponge has recently been complicated, such a distortion that the sealing sponge, when produced by a conventional continuous vulcanization method, is deformed owing to its own weight before the completion of vulcanization and foaming is generated, and such a problem that the desired shape cannot be retained is caused. Therefore, a sponge rubber which is excellent in shape-retention which is an index of the distortion has been required.

Moreover, in order to meet the request for reducing the cost of sponge rubber, an additional request has been raised for a sponge rubber which has been highly foamed, namely has a low sponge density and which is nevertheless excellent in sealing performance, namely low in permanent set in fatigue or excellent in shape-retention.

In addition to the above-mentioned characteristics, the sponge rubber is required to have excellent processibility in internal mixer, mill-processibility and extruder-processibility together with performance as a sponge rubber. In particular, in order to make the appearance of sponge rubber good and enhance the commercial value, it is severely required that gel or poorly dispersed spot of ingredients be little formed and that the skin of extrudate be good.

Under such circumstances, the prior art includes, for example, a method for improving the compression set by making higher the molecular weight of a copolymer rubber having an ethylene/α-olefin weight ratio of 73/27 to 40/60, a Mooney viscosity ($ML_{1+4}$ 121° C.) of 135 to 200 and a diolefin content of 10 to 36 in terms of iodine value as described in Japanese Patent Application Kokai No. 3-20, 339. However, according to such a method, the molecular weight is relatively high, so that when carbon black and oil are compounded in usual amounts, the viscosity of the resulting compound becomes high and hence it is difficult to highly foam the compound. Also, when it is intended to highly foam the compound, it is necessary to add the oil in a large amount. Therefore, the shape-retention is deteriorated and the stiffness of the sponge rubber becomes small.

Japanese Patent Application Kokai No. 4-80,245 describes a method using a copolymer rubber consisting of a low molecular weight copolymer and a high molecular weight copolymer, having an ethylene/α-olefin weight ratio of 73/27 to 40/60, a Mooney viscosity ($ML_{1+4}$ 121° C.) of 50 to 100, a diolefin content of 10 to 36 in terms of iodine value and a ratio of the iodine value of the low molecular weight copolymer to the iodine value of the high molecular weight copolymer of 1.1/1 to 4/1. According to such a method, the compression set is small and the extruder-processibility and the shape-retention are good; however, when the compound is highly foamed, the stiffness of the resulting sponge rubber becomes small.

Japanese Patent Application Kokoku No. 2-62,582 describes a method using a copolymer rubber consisting of an ethylene-α-olefin copolymer, 5-ethylidene-2-norbornene (ENB) and 5-vinyl-2-norbornene (VNB) in which the mole ratio of ENB/VNB copolymerized is 1/1 to 20/1, the total content of ENB and VNB is such that the iodine value of copolymer becomes 2 to 40 and has a specific molecular weight and a specific molecular weight distribution. However, according to such a method, the mill-processibility and extruder-processibility are good and in particular, such a sponge rubber that the surface skin of the extrudate is smooth is obtained; however, a highly foamed sponge rubber is disadvantageous in that the compression set is large and the stiffness is small.

The present inventors have made extensive research for solving the above-mentioned problems and have consequently found that an ethylene-α-olefin-non-conjugated diene copolymer rubber composition comprising a specific low molecular weight copolymer and a specific high molecular weight copolymer having a specific crystallinity, and when it is highly foamed, particularly, the stiffness is not deteriorated, the compression set is excellent, the shape-retention during the vulcanization and foaming is excellent, the extruded article has good edge rating, the surface skin of an extruded article is smooth and the amount of gel and poorly dispersed spot of ingredients formed during the kneading and extrusion is small.

SUMMARY OF THE INVENTION

It is an object of this invention is to provide an ethylene-α-olefin-non-conjugated diene copolymer rubber composition having a high foamability, an excellent processibility in internal mixer and an excellent extruder-processibility, and can produce, when it is highly foamed, such a sponge rubber that particularly the stiffness is not deteriorated, the compression set is small and the physical properties including shape-retention during the vulcanization and foaming are well-balanced.

Other objects and advantages of this invention will become apparent from the following description.

According to this invention, there is provided an ethylene-α-olefin-non-conjugated diene copolymer rubber composition which comprises:

(A) an ethylene-α-olefin-non-conjugated diene copolymer in which the ethylene/α-olefin weight ratio is 40/60 to 70/30; which contains as the non-conjugated dienes (a) ethylidenenorbornene and (b) either dicyclopentadiene or α,ω-diene having 8 to 20 carbon atoms in the main chain; and in which the amount of the ethylidenenorbornene is 35 to 50 in terms of the iodine value of the ethylene-α-olefin-non-conjugated diene copolymer, the amount of the dicyclopentadiene is 3 to 20 in terms of the iodine value of the ethylene-α-olefin-non-conjugated diene copolymer, the content of the α,ω-diene having 8 to 20 carbon atoms in the main chain is 0.05 to 5% by weight based on the total weight of the monomer components, and the Mooney viscosity ($ML_{1+8}$120° C.) is 20 to 65, and (B) an ethylene-α-olefin-non-conjugated diene copolymer in which the ethylene/α-olefin weight ratio is 70/30 to 90/10; which contains as the non-conjugated dienes (c) ethylidenenorbornene; and in which the ethylidenenorbornene content is 3 to 25 in terms of the iodine value of the ethylene-α-olefin-non-conjugated diene copolymer, the Mooney viscosity ($ML_{1+8}$120° C.) is 65 to 300, and the melting point of the crystal portion consisting of ethylene chain as measured by DSC is at least 40° C., the weight ratio of the component (A) to the component (B) being 30/70 to 70/30.

DETAILED DESCRIPTION OF THE INVENTION

Figure 1:
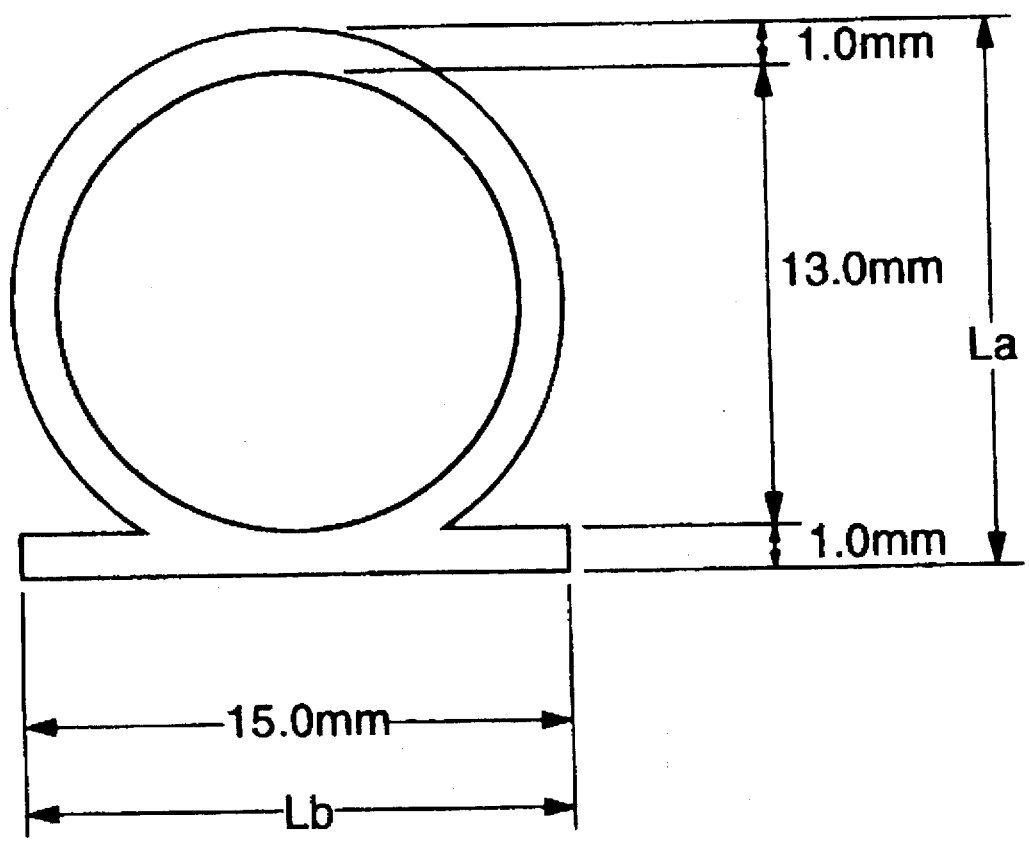
FIG. 1 is a cross-sectional view of a die of an extruder used in Examples and Comparative Examples for evaluating shape-retention and compression set.

The ethylene-α-olefin-non-conjugated diene copolymer rubber composition of this invention (referred to hereinafter as the copolymer rubber composition) is characterized by comprising the above-mentioned specific ethylene-α-olefin-non-conjugated diene copolymer (A) [referred to hereinafter as the copolymer rubber (A)] and the above-mentioned specific ethylene-α-olefin-non-conjugated diene copolymer (B) [referred to hereinafter as the copolymer rubber (B)].

The copolymer rubber (A) is a relatively low molecular weight copolymer rubber, and is basically a component which makes the total molecular weight of the copolymer rubber composition low, makes the highly foaming easy and contributes to the improvement of processibility in internal mixer, mill-processibility and extruder-processibility. Also, the copolymer rubber (A) has a low ethylene content for inhibiting the deterioration of the compression set at a low temperature as much as possible, contains the ethylidenenorbornene which is the component contributing to the increase of vulcanization rate in a relatively large amount as compared with the conventional copolymer rubber composition and also contains either dicyclopentadiene or α,ω-diene having 8 to 20 carbon atoms in the main chain which are components contributing to the formation of branches in order to make as small as possible the deterioration of shape-retention due to the lowered molecular weight.

Making the ethylidenenorbornene content large in the copolymer rubber (A) as mentioned above is the necessary requirement for increasing the vulcanization rate as a whole of the copolymer rubber composition because the copolymer rubber (B) which will be described hereinafter is crystalline and the ethylidenenorbornene content is relatively small, and is also the essential requirement for increasing the total content of the non-conjugated diene components, thereby preventing the compression set of the sponge from being deteriorated because the low molecular weight rubber component has a large compression set.

The copolymer rubber (B) is a copolymer rubber having a relatively high molecular weight and is the component which contains a relatively large amount of ethylene for forming a basically crystalline chain component consisting of ethylene, has a small content of the ethylidenenorbornene which is the non-conjugated diene component and contributes to the improvement of the stiffnes and shape-retention of the sponge.

As described above, in this invention, the objective copolymer rubber composition which is particularly suitable for a sponge rubber is obtained only when the copolymer rubbers (A) and (B) which are different in characteristics are blended in the specific amounts.

In addition, the copolymer rubber composition of this invention has such a feature that a compound containing the copolymer rubber composition becomes relatively hard owing to the crystallinity of the copolymer rubber (B) and hence the pelletization of the compound becomes easy.

The α-olefin used in this invention includes, for example, α-olefins having 3 to 12 carbon atoms, and specific examples thereof are propylene, 1-butene, 4-methyl-1-pentene, 1-hexene, 1-octene and the like. Among them, propylene is particularly preferable. These α-olefins may be used alone or in admixture of two or more.

The α,ω-diene having 8 to 20 carbon atoms in the main chain used in this invention (referred to hereinafter as the α,ω-diene) is represented by the formula (1):

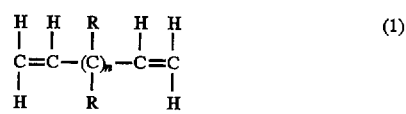

wherein R's may be the same as or different from one another and each represents a hydrogen atom, a saturated aliphatic hydrocarbon group having 1 to 10 carbon atoms or an unsaturated alicyclic hydrocarbon group having up to 10 carbon atoms and n represents an integer of 4 to 16.

Specific examples of such α,ω-dienes are 1,7-octadiene, 1,8-nonadiene, 1,9-decadiene, 1,11-dodecadiene, 1,13-tetradecadiene, 1,15-hexadecadiene, 1,17-octadecadiene, 1,19-eicosadiene, 3,6-dimethyl-1,7-octadiene, 4,5-dimethyl-1,7-octadiene, 5-methyl-1,8-nonadiene and the like. In view of cost, 1,7-octadiene and 1,9-decadiene are particularly preferable. The above α,ω-dienes may be used alone or in admixture of two or more.

Copolymer rubber (A)

The ethylene/α-olefin weight ratio in the copolymer rubber (A) used in this invention is 40/60 to 70/30, preferably 45/55 to 65/35. In this case, when the ethylene/α-olefin weight ratio is less than 40/60, the dispersion of the filler becomes insufficient, the surface skin is deteriorated and the strength of the sponge rubber is lowered. On the other hand, when the ethylene/α-olefin weight ratio is more than 70/30, the compression set at a low temperature of the sponge rubber becomes large.

The ethylidenenorbornene content of the copolymer rubber (A) is 35 to 50, preferably 38 to 48 in terms of iodine value of the copolymer. In this case, when the iodine value is less than 35, the compression set of the sponge rubber becomes large, and the vulcanization rate becomes low, so that outgassing results in a deterioration of surface skin and a deterioration of shape-retention. On the other hand, when the iodine value is more than 50, gel and poorly dispersed spot of ingredients tend to be formed during kneader-processing and extruder-processing and vulcanization rate and foaming rate become unbalanced, and hence, it becomes difficult to highly foam the copolymer rubber composition.

The dicyclopentadiene content of the copolymer rubber (A) is 3 to 20, preferably 4 to 15 in terms of the iodine value of the copolymer. In this case, when the dicyclopentadiene content is smaller than that which the said iodine value becomes 3, the shape-retention of the sponge is deteriorated. On the other hand, when the dicyclopentadiene content is larger than that which the said iodine value becomes 20, the extruder-processibility becomes low.

The $\alpha,\omega$-diene content of the copolymer rubber (A) is 0.05 to 5% by weight, preferably 0.05 to 2% by weight, based on the total weight of the monomer components. In this case, when the $\alpha,\omega$-diene content is less than 0.05% by weight, the shape-retention of the sponge rubber is deteriorated, while when it is more than 5% by weight, the extruder-processibility is deteriorated.

The copolymer rubber (A) may contain any one of the dicyclopentadiene and $\alpha,\omega$-diene, and the use of dicyclopentadiene is preferred in view of availability.

The Mooney viscosity ($ML_{1+8}$120° C.) of the copolymer rubber (A) is 20 to 65, preferably 25 to 60. In this case, when the Mooney viscosity ($ML_{1+8}$120° C.) is less than 20, the shape-retention of the sponge rubber is deteriorated and the surface skin is deteriorated by the outgassing during the vulcanization and foaming. On the other hand, when it is more than 65, it becomes difficult to highly foam the copolymer rubber composition and the processibility in internal mixer and extruder-processibility are deteriorated.

Mw/Mn of the copolymer rubber (A), which is a ratio of weight average molecular weight of the rubber (A) ($M_w$) to number average molecular weight of the rubber (A) ($M_n$), is preferably 4 to 10, more preferably 4 to 8. In this case, when ($M_w/M_n$) is more than 10, the compression set of the copolymer rubber (A) sometimes becomes large. On the other hand, when ($M_w/M_n$) is less than 4, extruder-processibility and mill-processibility may be deteriorated.

Copolymer rubber (B)

The ethylene/$\alpha$-olefin weight ratio of the copolymer rubber (B) used in this invention is 70/30 to 90/10, preferably 73/27 to 85/15. In this case, when the ethylene/$\alpha$-olefin weight ratio is less than 70/30, the crystal portion consisting of ethylene chain becomes a little and the stiffness of the sponge rubber is deteriorated. On the other hand, when it is more than 90/10, the viscosity becomes high in the production of the copolymer (B) and the reactor tends to be contaminated.

The ethylidenenorbornene content of the copolymer rubber (B) is 3 to 25, preferably 5 to 20, more preferably 5 to 10 in terms of the iodine value of the copolymer. In this case, when the ethylidenenorbornene content is smaller than that which the said iodine value becomes 3, the compression set of the sponge rubber becomes large, and the vulcanization rate becomes low, so that the surface skin is deteriorated by outgassing. On the other hand, when the ethylidenenorbornene content is larger than that which the said iodine value is 25, the production of the crystal portion consisting of ethylene chain in the copolymer rubber (B) is inhibited, the stiffness of the sponge rubber is deteriorated, and gel and poorly dispersed spot of ingredients tend to be formed during kneader-processing and extruder-processing.

The Mooney viscosity ($ML_{1+8}$120° C.) of the copolymer rubber (B) is 65 to 300, preferably 80 to 300. In this case, when the Mooney viscosity is less than 65, the shape-retention of the sponge rubber is deteriorated; the compression set of the sponge rubber becomes large; the surface skin is deteriorated by the outgassing during the vulcanization and foaming; the molecular weight is decreased; the ethylene chain becomes short as a result thereof; and the crystallinity is lowered. On the other hand, when the Mooney viscosity is more than 300, it becomes difficult to highly foam the copolymer rubber composition and the processibility in internal mixer and extruder-processibility are deteriorated.

The melting point of the ethylene crystal component in the copolymer rubber (B) as measured by DSC is at least 40° C., preferably 40° C. to 120° C. In this case, when the melting point is less than 40° C., the stiffness of the sponge rubber is deteriorated.

Mn/Mn of the copolymer (B) is preferably 2 to 4, more preferably 2-3.5. In this case, when Mw/Mn is more than 4, the crystallinity is lowered and the stiffness is deteriorated. On the other hand, when Mw/Mn is less than 2, extruder-processibility and mill-processibility may be deteriorated.

Process for producing copolymer rubbers (A) and (B)

The copolymer rubbers (A) and (B) of this invention can be produced by a conventional polymerization method.

As the polymerization method, there can be mentioned, for example, a method which comprises polymerizing ethylene, an $\alpha$-olefin and the above-mentioned non-conjugated dienes while feeding hydrogen as a molecular regulator in the presence of a Ziegler-Natta catalyst consisting of a transition metal compound and an organometallic compound, for example, a combination of a hydrocarbon solvent-soluble vanadium compound and an organoaluminum compound in a suitable solvent.

As the above-mentioned hydrocarbon solvent-soluble vanadium compound, there can be preferably used $VOCl_3$, $VCl_4$, and reaction products of $VOCl_3$ and/or $VCl_4$ with an alcohol. In this case, the alcohol includes methanol, ethanol, n-propanol, isopropanol, n-butanol, sec-butanol, t-butanol, n-hexanol, n-octanol, 2-ethylhexanol, n-decanol, n-dodecanol and the like, and preferable alcohols are alcohols having 3 to 8 carbon atoms.

The above organoaluminum compound includes, for example, triethylaluminum, triisobutylaluminum, tri-n-hexylaluminum, diethylaluminummonochloride, diisobutylaluminummonochloride, ethylaluminum sesquichloride, butylaluminum sesquichloride, ethylaluminum dichloride, butylaluminum dichloride and the like. These organoaluminum compounds may be used alone or in admixture of two or more. However, preferable organoaluminum compounds are ethylaluminum sesquichloride, butylaluminum sesquichloride, a mixture of ethylaluminum sesquichloride and triisobutylaluminum and a mixture of butylaluminum sesquichloride and triisobutylaluminum.

As the above solvent, a hydrocarbon solvent is preferably used, and more preferably used is, for example, n-pentane, n-hexane, n-heptane, n-octane, isooctane, cyclohexane and the like.

Copolymer rubber composition

The weight ratio of the copolymer rubber (A) to the copolymer rubber (B) in the copolymer rubber composition of this invention is 30/70 to 70/30, preferably 50/50 to 70/30. In this case, when the weight ratio of the copolymer rubber (A) to the copolymer rubber (B) is less than 30/70, the high foamability, mill-processibility, Banbury-processibility and extruder-processibility of the composition of this invention are deteriorated. On the other hand, when the weight ratio is more than 70/30, the shape-retention and stiffness of the sponge rubber are deteriorated.

The copolymer rubber composition of this invention can be produced by various production methods.

The processes for producing the copolymer rubber composition include, for example:

(1) a process which comprises mixing a solution of the copolymer rubber (A) and a solution of the copolymer rubber (B) and then removing the solvent to obtain a solid rubber composition, (2) a process which comprises producing any one of the copolymer rubber (A) and the copolymer rubber (B) by polymerization in the first reactor of two reactors which are connected in series, feeding the copolymer rubber produced to the second reactor, producing the other copolymer rubber by polymerization in the second reactor and thereafter removing the solvent to obtain a solid rubber composition, (3) a process which comprises mixing the solid copolymer rubber (A) and the solid copolymer rubber (B) in a conventional kneading machine such as a Banbury mixer, a twin roll mill, an extruder or the like to obtain a solid rubber composition, and the like.

The copolymer rubber composition of this invention may be compounded, if necessary, with a filler, a softening agent, a foaming agent, a cross-linking agent, and the like to form a rubber compound and this rubber compound may be subjected to foaming and cross-linking according to a generally used method, thereby producing a sponge rubber.

As the above-mentioned filler, preferable are inorganic fillers, for example, carbon black such as SRF, FEF, HAF, ISAF, SAF, FT, MT or the like; silica; calcium carbonate; magnesium carbonate; clay; talc; and the like.

The amount of the filler compounded is preferably 50 to 200 parts by weight per 100 parts by weight of the copolymer rubber composition.

The above-mentioned softening agent includes process oils such as aromatic oil, naphthenic oil, paraffinic oil and the like which are usually used in rubbers; vegetable oils such as coconut oil and the like; etc. In this case, process oils are preferable, among which paraffinic oil is particularly preferably used.

The amount of the softening agent compounded is preferably 30 parts by weight or more per 100 parts by weight of the copolymer rubber composition.

The above-mentioned cross-linking agent includes, for example, sulfur such as powdery sulfur, precipitated sulfur, colloidal sulfur, insoluble sulfur or the like; inorganic vulcanizing agents such as sulfur chloride, selenium, tellurium and the like; sulfur-containing organic compounds such as morpholine disulfide, alkylphenol disulfides, thiuram disulfides, dithiocarbamic acid salts and the like; and organic peroxides such as 1,1-di-t-butylperoxy-3,3,5-trimethylcyclohexane, di-t-butyl peroxide, dicumyl peroxide, t-butylcumyl peroxide, 2,5-dimethyl-2,5-di(t-butylperoxy)hexane, 1,3-bis(t-butylperoxyisopropyl)benzene and the like. These cross-linking agents may be used alone or in admixture of two or more.

The amount of the above-mentioned cross-linking agent compounded may be varied depending upon the kind of the cross-linking agent, and in the case of, for example, sulfur, the amount is preferably 0.1 to 10 parts by weight, more preferably 0.5 to 5 parts by weight, per 100 parts by weight of the copolymer rubber composition.

When sulfur is used as the cross-linking agent, there may be further compounded a vulcanization accelerator and accelerator activator as required.

Said vulcanization accelerator includes, for example, aldehyde ammonias such as hexamethylenetetramine and the like; guanidines such as diphenylguanidine, di(o-tolyl) guanidine, o-tolylbiguanide and the like; thioureas such as thiocarbanilide, di(o-tolyl)thiourea, N,N'-diethylthiourea, tetramethylthiourea, trimethylthiourea, dilaurylthiourea and the like; thiazoles such as mercaptobenzothiazole, dibenzylthiazole disulfide, 2-(4-morpholinothio)benzothiazole, 2-(2,4-dinitrophenyl)mercaptobenzothiazole, N,N'-diethylthiocarbamoylthio-benzothiazole and the like; sulfenamides such as N-t-butyl-2-benzothiazyl sulfenamide, N,N'-dicyclohexyl-2-benzothiazyl sulfenamide, N,N'-diisopropyl-2-benzothiazyl sulfenamide, N-cyclohexyl-2-benzothiazyl sulfenamide and the like; thiurams such as tetramethylthiuram disulfide, tetraethylthiuram disulfide, tetrabutylthiuram disulfide, tetramethylthiuram monosulfide, dipentamethylenethiuram tetrasulfide and the like; carbamic acid salts such as zinc dimethyldithiocarbamate, zinc diethyldithiocarbamate, zinc di-n-butyldithiocarbamate, zinc ethylphenyldithiocarbamate, sodium dimethyldithiocarbamate, copper dimethyldithiocarbamate, tellurium dimethyldithiocarbamate, iron dimethyldithiocarbamate and the like; xanthogenic acid salts such as zinc butylthioxanthogenate and the like; etc. These vulcanization accelerators may be used alone or in admixture of two or more.

The amount of the above-mentioned vulcanization accelerator compounded is preferably 0.1 to 20 parts by weight, more preferably 0.2 to 10 parts by weight, per 100 parts by weight of the copolymer rubber composition.

The accelerator activator mentioned above includes metal oxides such as magnesium oxide, zinc flower, litharge, red lead, white lead and the like; organic acids such as stearic acid, oleic acid, and the like; etc. In particular, zinc flower and stearic acid are preferable.

The amount of the above-mentioned accelerator activator compounded is preferably 3 to 20 parts by weight per 100 parts by weight of the copolymer rubber composition.

When an organic peroxide is used as the cross-linking agent, a cross-linking coagent may be further added as required.

Said cross-linking coagent includes, for example, sulfur; sulfur compounds such as dipentamethylenethiuram tetrasulfide and the like; polyfunctional monomers such as polyethylene dimethacrylate, divinylbenzene, diallyl phthalate, triallyl cyanurate, metaphenylene bismaleimide, toluylene bismaleimide and the like; oxime compounds such as p-quinoneoxime, p,p-benzoylquinoneoxime and the like; etc. These cross-linking coagents may be used alone or in admixture of two or more.

Moreover, the foaming agent includes inorganic foaming agents such as ammonium carbonate, sodium bicarbonate, anhydrous sodium nitrate and the like; organic foaming agents such as dinitrosopentamethylenetetramine, N,N'-dimethyl-N,N'-dinitrosoterephthalamide, benzenesulfonyl hydrazide, p,p'-oxybis(benzenesulfonyl hydrazide), 3,3'-disulfonhydrazidephenylsulfone, azoisobutyronitrile, azobisformamide and the like.

These foaming agents may be used alone or in admixture of two or more. Also, a urea type, organic acid type or metal salt type foaming adjuvant may be used together with the above foaming agents.

The amount of the above-mentioned foaming agent compounded is preferably 0.5 to 20 parts by weight, more preferably 1 to 15 parts by weight, per 100 parts by weight of the copolymer rubber composition and the amount of the above-mentioned foaming adjuvant compounded is preferably 1 to 20 parts by weight per 100 parts by weight of the copolymer rubber composition.

Moreover, the copolymer rubber composition of this invention may have compounded therewith additives which are used in a conventional rubber such as a reinforcing agent, a moisture absorbent, a plasticizer, an antioxidant, a heat-stabilizer, ultraviolet absorbent, a lubricant, a release agent, a flame retardant, an antistatic agent, a pigment and the like; and conventional rubbery or non-rubbery polymers.

The above-mentioned other polymers include, for example, butyl rubber, natural rubber, polyisoprene rubber, polybutadiene rubber, styrene-butadiene rubber, acrylonitrile-butadiene rubber, other ethylene-α-olefin-non-conjugated diene copolymers than the copolymer rubbers (A) and (B), ethylene-α-olefin copolymers, polyethylene, polypropylene and the like.

The method and order of compounding the above-mentioned additives with the copolymer rubbers of this invention are not critical, and known mixing machines and known extruders may be used. However, it is preferable to mix the copolymer rubber composition, the filler, the softening agent and the like using a Banbury mixer or the like and thereafter mix the vulcanizing agent, the foaming agent, the foaming adjuvant and the like with the mixture using a twin roll mill or the like.

Subsequently, a sponge rubber can be produced from the rubber compound using a known cross-linking-foaming apparatus according to the procedure used in the production of a conventional sponge rubber.

For example, a sponge rubber can be produced by a method in which the rubber compound is placed in a mold and the temperature of the mold is elevated to foam and cross-link the rubber compound, a method in which the rubber compound is formed into any desired shape using an extruder and thereafter the thus shaped rubber compound is continuously heated in a cross-linking apparatus to undergo foaming and cross-linking, or other like methods.

The copolymer rubber composition of this invention has a high foamability and is excellent in processibility in internal mixer, mill-processibility and extruder-processibility, and when foamed, gives a sponge rubber in which the stiffness is not deteriorated, is excellent in compression set and surface skin, also excellent in the shape-retention during cross-linking and foaming, and has good edge rating caused during the extruder-processing and little gel and poorly dispersed spot of ingredients produced during the kneader-processing and extruder-processing. Also, the copolymer rubber composition of this invention has such a feature that when it is used, the pelletization of a compound is easy.

Accordingly, the copolymer rubber composition of this invention can be very suitably used, in the form of a sponge rubber, particularly in sealing members such as door seal, body side seal, roof side rail, trunk seal and the like of automobile; and are also useful in a wide use including seal members for civil engineering and construction industry and seal members for machine and apparatus, electric wire coatings and the like.

DESCRIPTION OF THE PREFERRED EMBODIMENTS

Examples and Comparative Examples are shown below to explain this invention in more detail. However, this invention should not be construed to be limited thereto.

In the Examples and the Comparative Examples, the measurements and evaluations were effected according to the following methods.

(1) Propylene content (% by weight)

Measured by an infrared absorption spectrum method.

(2) Iodine value

Measured according to an infrared absorption spectrum method.

(3) Mooney viscosity ($ML_{1+8}120°$ C.)

Measured under such conditions that the measurement temperature was 120° C., the preheating time was one minute and the time taken until the viscosity was read was eight minutes.

(4) Melting point of ethylene crystal

A sample was heated at 20° C./minute from room temperature to 160° C. using a DSC220C manufactured by Seiko Denshi Kabushiki Kaisha, retained at 160° C. for ten minutes, then cooled at 10° C./minute to −110° C., kept at −110° C. for ten minutes, and then heated again at 20° C./minute to 160° C.; and the melting point was determined from the thus obtained heat-absorption peak at this second heat elevation time according to JIS K7121.

(5) Extruder-processibility (Garvey die evaluation)

Measured according to the ASTM-D2230A method.

(6) Shape-retention

A molded article obtained by extruding an unvulcanized rubber through a die having the sectional shape shown in FIG. 1 was allowed to stand in the horizontal state for seven minutes in an atmosphere kept at 220° C., and thereafter, the shape-retention was evaluated on the basis of $(La/Lb) \times 100$ in which La represents the height size of the molded article and Lb represents the transverse size of the molded article as shown in FIG. 1.

(7) Sponge characteristics (i) Sponge density

Measured according to the expanded rubber physical test method in the Society of Rubber Industrial Japan Standards.

(ii) Compression set

According to JIS K6301, a molded article obtained by extrusion through a die having the sectional shape shown in FIG. 1 was vulcanized and foamed and then subjected to 50% compressive strain in the height direction in FIG. 1, and the compressive strains after 22 hours at 70° C. and after 200 hours at 70° C. were measured.

(iii) Stiffness (tensile stress in small strain)

A sponge rubber was punched to obtain a test piece of 100 mm×5 mm×about 2 mm in size, and the test piece was subjected to measurement of 25% tensile stress according to JIS K6301.

(iv) Sponge surface skin

The skin was evaluated visually on the smoothness of surface of sponge rubber, gloss and adhesiveness based on three ratings of excellent, fair and bad.

(8) Gelation time

A sample obtained by kneading a rubber compound shown in the compounding [I] in Table 1 was subjected to measurement of the starting time of torque rise at 130° C. at a rate of shearing strain of 20/second by means of a stress relaxation measuring apparatus [JSR Elastograph manufactured by Japan Synthetic Rubber Co., Ltd. (see Japanese Patent Application Kokoku No. 5-25,059)].

(9) Measurement of Mw/Mn

Mw/Mn was measured according to a gel permeation chromatography (GPC) method as follows:

(1) Using polystyrenes (monodisperse polystyrenes manufactured by Tosoh Corp.) whose molecular weights were known, their molecular weights (M) and GPC counts were measured. Using these data, a calibration curve regarding the correlation between molecular weight (M) and elution volume (EV) was prepared. A concentration of 0.02% by weight was used.

(2) The GPC pattern of a sample was measured according to the GPC method and applied to the above calibration curve, whereby a polystyrene-reduced number-average molecular weight (Mn) and weight-average molecular weight (Mw) were obtained, and then Mw/Mn was obtained by calibration. In this case, the sample preparation was made as follows and the GPC measurement conditions were as follows:

[Sample preparation]

(a) A sample and o-dichlorobenzene were placed in an Erlenmeyer flask so that the sample concentration became 0.15% by weight.

(b) To the flask containing the resulting sample polymer solution was added 2,6-di-tert-butyl-p-cresol (anioxidant) in an amount of 0.08% by weight based on the sample polymer solution.

(c) The flask was heated to 135° C. and stirred for about 30 minutes for dissolution.

(d) The solution was filtered and the resulting filtrate was subjected to gel permeation chromatography.

[GPC measurement conditions]

GPC measurement was carried out at the following conditions:

(a) Apparatus: Model 150C, manufactured by Waters (b) Column: H type, manufactured by Tosoh Corp.

(c) Sample amount: 500 µl (d) Temperature: 135° C.

Flow rate: 1 ml/min

TABLE 1

| Compounding | Component | Parts by weight |
|---|---|---|
| [I] | Copolymer rubber mixture | 100 |
| | Carbon black (*1) | 100 |
| | Paraffinic oil (*2) | 70 |
| | Zinc flower | 8 |
| | Stearic acid | 2 |
| | Moisture abosrbent (*3) | 5 |
| [II] | Sulfur | 1 |
| | Vulcanization accelerator M (*4) | 0.5 |
| | Vulcanization accelerator PZ (*5) | 1 |
| | Vulcanization accelerator BZ (*6) | 0.4 |
| | Vulcanization accelerator TRA (*7) | 0.8 |
| | Vulcanization accelerator TET (*8) | 0.5 |
| | Vulnoc R (*9) | 0.5 |
| | Foaming agent (*10) | 4.5 |

In Table 1, (*1) to (*10) have the following meanings:

TABLE 1-continued

| Compounding | Component | Parts by weight |
|---|---|---|

(*1) Asahi 50HG manufactured by Asahi Carbon Kabushiki Kaisha
(*2) Daiana process Oil PW-380 manufactured by Idemitsu Kosan Kabushiki Kaisha
(*3) Calcium oxide (Vesta PP) manufactured by Inoue Sekkai Kabushiki Kaisha
(*4) Mercaptobenzothiazole
(*5) Zinc dimethyldithiocarbamate
(*6) Zinc di-n-butyldithiocarbamate
(*7) Dipentamethylenethiuram tetrasulfide
(*8) Tetraethylthiuram disulfide
(*9) Morpholine disulfide (manufactured by Ohuchi Shinko Kagaku Kabushiki Kaisha)
(*10) p,p'-Oxybis(benzenesulfonyl hydrazide)

EXAMPLES 1 TO 3 AND COMPARATIVE EXAMPLES 1 TO 8

Using the copolymer rubbers shown in Tables 2 to 5, the components shown in the compounding [I] in Table 1 were kneaded for five minutes at 60 rpm in a BR type Banbury mixer (internal content: 1.7 liters) kept at a temperature of 50° C. to obtain a compound [referred to hereinafter as Compound (1)]. The additives shown in the compounding [II] in Table 1 were added to Compound (1), and the resulting mixture was kneaded on a 10-inch twin roll mill kept at 50° C. to obtain a compound [referred to hereinafter as Compound (2)].

Subsequently, a Garvey die (as defined in ASTM-D2330) was mounted on a 50 ram-extruder, in which the cylinder temperature and the die temperature were set at 60° C. and 80° C., respectively, and Compound (2) was extruded through the die to evaluate the extruder-processibility. Moreover, a die having the sectional shape shown in FIG. 1 was mounted on the 50-mm extruder in which the cylinder temperature, the die temperature and the number of revolutions were set at 60° C., 80° C. and 30 rpm, respectively, and Compound (2) was extruded through the die and then heated for ten minutes in a hot air oven kept at 200° C. to be cross-linked and foamed, thereby obtaining a sponge rubber.

The evaluation results of the resulting sponge rubbers are shown in Tables 2 to 5.

TABLE 2

| | Example 1 | | | Example 2 | | | Example 3 | | |
|---|---|---|---|---|---|---|---|---|---|
| | Copolymer rubber | | Copolymer rubber composition | Copolymer rubber | | Copolymer rubber composition | Copolymer rubber | | Copolymer rubber composition |
| Items | (A) | (B) | tion | (A) | (B) | tion | (A) | (B) | tion |
| Mooney viscosity (ML$_{1+8}$ 120° C.) | 45 | 100 | (73) | 44 | 140 | (92) | 26 | 142 | (84) |
| Propylene content (wt. %) | 50 | 21 | (35.5) | 50 | 21 | (35.5) | 51 | 21 | (36) |
| Ethylidenenorbornene content (iodine value) | 40 | 11 | (25.5) | 41 | 11 | (26) | 39 | 10 | (25) |
| Dicyclopentadiene content (iodine value) | 10 | 0 | (5) | 0 | 0 | (0) | 10 | 0 | (5) |
| 1,9-Decadiene content (wt. %) | 0 | 0 | (0) | 0.5 | 0 | (0.25) | 0 | 0 | (0) |
| Mw/Mn | 5.2 | 2.5 | 5.1 | 5.5 | 2.3 | 5.3 | 5.7 | 2.4 | 5.5 |
| M.P. of ethylene | — | 53 | — | — | 49 | — | — | 55 | — |

TABLE 2-continued

| | Example 1 | | | Example 2 | | | Example 3 | | |
|---|---|---|---|---|---|---|---|---|---|
| | Copolymer rubber | | Copolymer rubber composi- | Copolymer rubber | | Copolymer rubber composi- | Copolymer rubber | | Copolymer rubber composi- |
| Items | (A) | (B) | tion | (A) | (B) | tion | (A) | (B) | tion |
| crystal (°C.) | | | | | | | | | |
| Copolymer rubber (A)/copolymer rubber (B) wt. ratio | — | — | 50/50 | — | — | 50/50 | — | — | 50/50 |
| Extruder-processibility | | | | | | | | | |
| Swell & porosity | | | 4 | | | 4 | | | 4 |
| Edge | | | 4 | | | 4 | | | 4 |
| Surface skin | | | 4 | | | 4 | | | 4 |
| Corner | | | 4 | | | 4 | | | 4 |
| Shape-retention (%) | | | 90 | | | 92 | | | 85 |
| (Physical properties of sponge) | | | | | | | | | |
| Specific gravity | | | 0.49 | | | 0.55 | | | 0.52 |
| Compression set (%) (70° C. × 22 hrs) | | | 10 | | | 9 | | | 10 |
| Compression set (%) (70° C. × 200 hrs) | | | 21 | | | 17 | | | 19 |
| 25% low tensile stress (kPa) | | | 260 | | | 280 | | | 290 |
| Surface skin | | | Excellent | | | Excellent | | | Excellent |
| Gelation time (sec) | | | >600 | | | >550 | | | >600 |

Note: Numerals in parentheses of compositions are calculated values.

TABLE 3

| | Comparative Example 1 | | | Comparative Example 2 | | | Comparative Example 3 | | |
|---|---|---|---|---|---|---|---|---|---|
| | Copolymer rubber | | Copolymer rubber composi- | Copolymer rubber | | Copolymer rubber composi- | Copolymer rubber | | Copolymer rubber composi- |
| Items | (A) | — | tion | — | (B) | tion | — | (B) | tion |
| Mooney viscosity ($ML_{1+8}$ 120° C.) | 45 | 97 | (71) | 47 | 100 | (74) | 70 | 140 | (105) |
| Propylene content (wt. %) | 50 | 21 | 36 | 50 | 21 | 36 | 50 | 21 | 36 |
| Ethylidenenorbornene content (iodine value) | 40 | 11 | 26 | 20 | 11 | 16 | 40 | 11 | 26 |
| Dicyclopentadiene content (iodine value) | 10 | 0 | (5) | 10 | 0 | (5) | 10 | 0 | (5) |
| 1,9-Decadiene content (wt. %) | 0 | 0 | (0) | 0 | 0 | (0) | 0 | 0 | (0) |
| Mw/Mn | 5.0 | 2.5 | 5.2 | 4.2 | 2.3 | 3.8 | 5.5 | 2.1 | 5.3 |
| M.P. of ethylene crystal (°C.) | — | 38 | — | — | 53 | — | — | 49 | — |
| Copolymer rubber (left column*1)/ Copolymer rubber (right column*2) wt. ratio | — | — | 50/50 | — | — | 50/50 | — | — | 50/50 |
| Extruder-processibility | | | | | | | | | |
| Swell & porosity | | | 4 | | | 4 | | | 3 |
| Edge | | | 2 | | | 4 | | | 2 |
| Surface skin | | | 4 | | | 4 | | | 3 |
| Corner | | | 4 | | | 4 | | | 3 |

TABLE 3-continued

|  | Comparative Example 1 | | | Comparative Example 2 | | | Comparative Example 3 | | |
|---|---|---|---|---|---|---|---|---|---|
| Items | Copolymer rubber (A) | — | Copolymer rubber composition | Copolymer rubber — | (B) | Copolymer rubber composition | Copolymer rubber — | (B) | Copolymer rubber composition |
| Shape-retention (%) (Physical properties of sponge) | | | 85 | | | 72 | | | 91 |
| Specific gravity | | | 0.48 | | | 0.61 | | | 0.65 |
| Compression set (%) (70° C. × 22 hrs) | | | 11 | | | 15 | | | 9 |
| Compression set (%) (70° C. × 200 hrs) | | | 21 | | | 31 | | | 17 |
| 25% low tensile stress (kPa) | | | 205 | | | 270 | | | 300 |
| Surface skin | | | Excellent | | | Bad | | | Excellent |
| Gelation time | | | >600 | | | >600 | | | >190 |

Note:
(1) Numerals in parentheses of composition are calculated values.
(2) "Copolymer rubber (left column*1)" means, for example, copolymer rubber "(A)" in Comparative Example 1.
(3) "Copolymer rubber (right column*2)" means, for example, copolymer rubber "—" in Comparative Example 1.

TABLE 4

|  | Comparative Example 4 | | | Comparative Example 5 | | | Comparative Example 6 |
|---|---|---|---|---|---|---|---|
|  | Copolymer rubber | Copolymer rubber | Copolymer rubber | Copolymer rubber | Copolymer rubber | Copolymer rubber | Copolymer rubber |
| Items | (A) | — | composition | (A) | — | composition | — |
| Mooney viscosity (ML$_{1+8}$ 120° C.) | 45 | 99 | (72) | 45 | 59 | (52) | 91 |
| Propylene content (wt. %) | 50 | 36 | (43) | 50 | 21 | 36 | 36 |
| Ethylidenenorbornene content (iodine value) | 40 | 10 | (25) | 40 | 10 | (25) | 26 |
| Dicyclopentadiene content (iodine value) | 10 | 0 | (5) | 10 | 0 | (5) | 5 |
| 1,9-Decadiene content (wt. %) | 0 | 0 | (0) | 0 | 0 | (0) | 0 |
| Mw/Mn | 5.2 | 2.3 | 2.1 | 5.5 | 2.2 | 5.4 | 3.7 |
| M.P. of ethylene crystal (°C.) | — | −14 | — | — | 37 | — | — |
| Copolymer rubber (left column*1)/ Copolymer rubber (right column*2) wt. ratio | — | — | 50/50 | — | — | 50/50 | — |
| Extruder-processibility | | | | | | | |
| Swell & porosity | | | 4 | | | 4 | 4 |
| Edge | | | 2 | | | 4 | 2 |
| Surface skin | | | 4 | | | 4 | 4 |
| Corner | | | 4 | | | 4 | 3 |
| Shape-retention (%) (Physical properties of sponge) | | | 88 | | | 68 | 72 |
| Specific gravity | | | 0.50 | | | 0.41 | 0.69 |
| Compression set (%) | | | 10 | | | 14 | 10 |

TABLE 4-continued

|  | Comparative Example 4 | | Comparative Example 5 | | Comparative Example 6 |
| --- | --- | --- | --- | --- | --- |
|  | Copolymer rubber | Copolymer rubber | Copolymer rubber | Copolymer rubber | Copolymer rubber |
| Items | (A) | — composition | (A) | — composition | — |
| (70° C. × 22 hrs) Compression set (%) |  | 21 |  | 29 | 20 |
| (70° C. × 200 hrs) 25% low tensile stress (kPa) |  | 195 | 180 | 330 |  |
| Surface skin |  | Excellent |  | Bad | Excellent |
| Gelation time (sec) |  | >600 |  | >600 | 250 |

Note:
(1) Numerals in parentheses of composition are calculated values.
(2) "Copolymer rubber (left column*[1])" means, for example, copolymer rubber "(A)" in Comparative Example 4.
(3) "Copolymer rubber (right column*[2])" means, for example, copolymer rubber "—" in Comparative Example 4.

TABLE 5

|  | Comparative Example 7 | | | Comparative Example 8 | | |
| --- | --- | --- | --- | --- | --- | --- |
|  | Copolymer rubber | | Copolymer rubber composi- | Copolymer rubber | | Copolymer rubber composi- |
| Items | (A) | (B) | tion | (A) | (B) | tion |
| Mooney viscosity ($ML_{1+8}$ 120° C.) | 45 | 100 | (56) | 45 | 100 | (89) |
| Propylene content (wt. %) | 50 | 21 | (44) | 50 | 21 | (27) |
| Ethylidenenorbornene content (iodine value) | 40 | 11 | (34) | 40 | 11 | (17) |
| Dicyclopentadiene content (iodine value) | 10 | 0 | (8) | 10 | 0 | (2) |
| 1,9-Decadiene content (wt. %) | 0 | 0 | (0) | 0 | 0 | (0) |
| Mw/Mn | 5.2 | 2.5 | 5.0 | 5.2 | 2.5 | 3.5 |
| M.P.of ethylene crystal (°C.) | — | 53 |  | — | 53 |  |
| Copolymer rubber (A)/copolymer rubber (B) wt. ratio | — | — | 80/20 | — | — | 20/80 |
| Extruder-processibility |  |  |  |  |  |  |
| Swell & porosity |  |  | 4 |  |  | 3 |
| Edge |  |  | 2 |  |  | 3 |
| Surface skin |  |  | 4 |  |  | 3 |
| Corner |  |  | 4 |  |  | 3 |
| Shape-retention (%) |  |  | 65 |  |  | 92 |
| (Physical properties of sponge) |  |  |  |  |  |  |
| Specific gravity |  |  | 0.39 |  |  | 0.65 |
| Compression set (%) (70° C. × 22 hrs) |  |  | 10 |  |  | 9 |
| Compression set (%) (70° C. × 200 hrs) |  |  | 21 |  |  | 17 |
| 25% low tensile stress (kPa) |  |  | 190 |  |  | 370 |

TABLE 5-continued

|  | Comparative Example 7 | | | Comparative Example 8 | | |
| --- | --- | --- | --- | --- | --- | --- |
|  | Copolymer rubber | | Copolymer rubber composition | Copolymer rubber | | Copolymer rubber composition |
| Items | (A) | (B) |  | (A) | (B) |  |
| Surface skin |  |  | Bad |  |  | Excellent |
| Gelation time (sec) |  |  | 250 |  |  | 550 |

Note: Numerals in parentheses of compositions are calculated values.

From the results shown in Tables 2 to 5, it can be seen that the copolymer rubber compositions of this invention produce sponge rubbers each of which has been highly foamed, has a small sponge density, does not show deterioration of stiffness, has an excellent extruder-processibility, a good shape-retention and a small compression set and shows a long gelation time.

On the other hand, in the case of the copolymer rubber composition of Comparative Example 1, the melting point of the high molecular weight polymer is low, and hence, the crystallinity is insufficient, the stiffness is small, and the extruder-processibility is inferior.

In the case of the copolymer rubber composition of Comparative Example 2, the ethylidenenorbornene content of the low molecular weight polymer is small, so that the sponge density of sponge is large, the shape-retention is inferior, the compression set is large and the surface skin is bad owing to outgassing.

In the case of the copolymer rubber composition of Comparative Example 3, the Mooney viscosity ($ML_{1+8}120°$ C.) of the low molecular weight polymer is high, so that the sponge density of sponge is high, the extruder-processibility is inferior and the gelation time is short.

In the case of the copolymer rubber composition of Comparative Example 4, the propylene content of the high molecular weight polymer is high, so that the crystallinity is insufficient and the stiffness is small.

In the case of the copolymer rubber composition of Comparative Example 5, the Mooney viscosity of the high molecular weight polymer is small, so that the shape-retention is inferior, the compression set is large, and the surface skin is bad owing to outgassing.

In the case of the copolymer rubber composition of Comparative Example 6, though the average composition is substantially the same as that of the copolymer rubber composition of Example 2, the composition consists of a single copolymer unlike the copolymer rubber composition of this invention, so that the sponge density of sponge is high, the extruder-processibility and shape-retention are inferior, and the gelation time is short.

In the case of the copolymer rubber composition of Comparative Example 7, the blend weight ratio of the low molecular weight polymer in the copolymer rubber composition is large, so that the stiffness is small, the shape-retention is inferior and the surface skin of the sponge is bad.

In the case of the copolymer rubber composition of Comparative Example 8, the blend weight ratio of the high molecular weight polymer in the copolymer rubber composition is large, so that the composition is not highly foamed and the extruder-processibility is inferior.

What is claimed is:

1. An ethylene-$\alpha$-olefin-non-conjugated diene copolymer rubber composition which comprises:
    (A) an ethylene-$\alpha$-olefin-non-conjugated diene copolymer in which the ethylene/$\alpha$-olefin weight ratio is 40/60 to 70/30; which contains as the non-conjugated dienes (a) ethylidenenorbornene and (b) either dicyclopentadiene or $\alpha,\omega$-diene having 8 to 20 carbon atoms in the main chain; and in which the content of the ethylidenenorbornene is 38 to 48 in terms of the iodine value of the ethylene-$\alpha$-olefin-non-conjugated diene copolymer, the content of the dicyclopentadiene is 3 to 20 in terms of the iodine value of the ethylene-$\alpha$-olefin-non-conjugated diene copolymer, the content of the $\alpha,\omega$-diene having 8 to 20 carbon atoms in the main chain is 0.05 to 5% by weight based on the total weight of the monomer components, and the Mooney viscosity ($ML_{1+8}120°$ C.) is 20 to 65, and
    (B) an ethylene-$\alpha$-olefin-non-conjugated diene copolymer in which the ethylene/$\alpha$-olefin weight ratio is 73/27 to 85/15; which contains as the non-conjugated dienes (c) ethylidenenorbornene; and in which the content of the ethylidenenorbornene is 3 to 25 in terms of the iodine value of the ethylene-$\alpha$-olefin-non-conjugated diene copolymer, the Mooney viscosity ($ML_{1+8}120°$ C.) is 65 to 300, and the melting point of the crystal portion consisting of ethylene chain as measured by DSC is at least 40° C.,
    the weight ratio of the component (A) to the component (B) being 30/70 to 70/30,
    and wherein the copolymer rubber (A) has a weight average molecular weight/number average molecular weight, Mw/Mn of 4 to 10, and the copolymer rubber (B) has a Mw/Mn of 2 to 4.

2. The composition according to claim 1, wherein the $\alpha$-olefin is an $\alpha$-olefin having 3 to 12 carbon atoms.

3. The composition according to claim 1, wherein the $\alpha$-olefin is propylene.

4. The composition according to claim 1, wherein the $\alpha,\omega$-diene having 8 to 20 carbon atoms in the main chain is a diene represented by the formula (1):

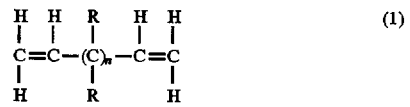

wherein R's may be the same as or different from one another and each represents a hydrogen atom, a saturated aliphatic hydrocarbon group having 1 to 10 carbon atoms or an unsaturated alicyclic hydrocarbon group having up to 10 carbon atoms and n represents an integer of 4 to 16.

5. The composition according to claim 1, wherein the ethylene/α-olefin weight ratio of the copolymer rubber (A) is 45/55 to 65/35.

6. The composition according to claim 1, wherein the ethylidenenorbornene content of the copolymer rubber (A) is 38 to 48 in terms of the iodine value of the ethylene-α-olefin-non-conjugated diene copolymer.

7. The composition according to claim 1, wherein the dicyclopentadiene content of the copolymer rubber (A) is 4 to 15 in terms of the iodine value of the ethylene-α-olefin-non-conjugated diene copolymer rubber.

8. The composition according to claim 1, wherein the component (b) in the copolymer rubber (A) is dicyclopentadiene.

9. The composition according to claim 1, wherein the Mooney viscosity ($ML_{1+8}$ 120° C.) of the copolymer rubber (A) is 25 to 60.

10. The composition according to claim 1, wherein the ethylene/α-olefin weight ratio of the copolymer rubber (A) is 73/27 to 85/15.

11. The composition according to claim 1, wherein the ethylidenenorbornene content of the copolymer rubber (B) is 5 to 10 in terms of the iodine value of the ethylene-α-olefin-non-conjugated diene copolymer.

12. The composition according to claim 1, wherein the Mooney viscosity ($ML_{1+8}$ 120° C.) of the copolymer rubber (B) is 80 to 300.

13. The composition according to claim 1, wherein the melting point of the ethylene crystal portion in the copolymer rubber (B) is 40° to 55° C. as measured by DSC.

14. The composition according to claim 1, wherein the weight ratio of the copolymer rubber (A) to the copolymer rubber (B) is 50/50 to 70/30.

15. The composition according to claim 1, which further comprises at least one foaming agent selected from the group consisting of inorganic foaming agents and organic foaming agents, in an amount of 0.5 to 20 parts by weight per 100 parts by weight of the copolymer rubber composition.

* * * * *